(12) United States Patent
Kaizu et al.

(10) Patent No.: US 7,104,911 B2
(45) Date of Patent: Sep. 12, 2006

(54) HYDRAULIC CONTROL DEVICE FOR AUTOMATIC TRANSMISSION

(75) Inventors: Kenichi Kaizu, Fuji (JP); Hideharu Yamamoto, Fuji (JP)

(73) Assignee: Jatco LTD, (JP)

( * ) Notice: Subject to any disclaimer, the term of this patent is extended or adjusted under 35 U.S.C. 154(b) by 163 days.

(21) Appl. No.: 10/941,196

(22) Filed: Sep. 15, 2004

(65) Prior Publication Data

US 2005/0064982 A1    Mar. 24, 2005

(30) Foreign Application Priority Data

Sep. 18, 2003    (JP)    ............................. 2003-326696

(51) Int. Cl.
*F16H 31/00*    (2006.01)
(52) U.S. Cl. ....................................... 475/127
(58) Field of Classification Search ................ 475/127, 475/128; 477/155
See application file for complete search history.

(56) References Cited

U.S. PATENT DOCUMENTS

| | | | |
|---|---|---|---|
| 6,537,170 B1 * | 3/2003 | Murasugi et al. | 475/128 |
| 6,540,635 B1 * | 4/2003 | Sano | 475/120 |
| 6,860,830 B1 * | 3/2005 | Saitou et al. | 475/127 |

* cited by examiner

*Primary Examiner*—Dirk Wright
(74) *Attorney, Agent, or Firm*—Rossi, Kimms & McDowell, LLP

(57) ABSTRACT

A hydraulic control device for an automatic transmission comprises an engagement element pressure control section for controlling an engagement element pressure, engagement elements supplied with the engagement element pressure, and an oil pressure switches provided in oil supply paths of the engagement element pressure. The plural gear positions are achieved by engaging or disengaging the engagement elements. The engagement element pressure control section controls the engagement element pressure with a first gain when the engagement elements are in the shifting state and controls the engagement element pressure with a second gain when the engagement elements are in the engagement state.

7 Claims, 13 Drawing Sheets

Fig. 2

| Gear Position | Engagement Element | C1 | C2 | C3 | B1 | B2 |
|---|---|---|---|---|---|---|
| Forward | 1st | ○ | | | ○ | |
| | 2nd | ○ | | | | ○ |
| | 3rd | ○ | ○ | | | |
| | 4th | ○ | | ○ | | |
| | 5th | | ○ | ○ | | |
| | 6th | | | ○ | | ○ |
| Reverse | | | ○ | | ○ | |

(a)

(b)

HYDRAULIC CONTROL DEVICE FOR AUTOMATIC TRANSMISSION

BACKGROUND OF THE INVENTION

1. Field of the Invention

The present invention relates to a hydraulic control device for an automatic transmission.

2. Description of the Prior Art

An automatic transmission has a transmission mechanism that is comprised of rotational elements such as planetary gear sets and engagement elements such as clutches and brakes that engage and disengage the rotational elements. The engagement elements are respectively actuated by oil pressure, and a plurality of gear positions are obtained by engaging and disengaging the engagement elements in predetermined combinations.

FIG. 13 shows a hydraulic circuit of an oil pressure that is supplied to the engagement elements.

The hydraulic circuit generating an engagement element pressure Pc that is supplied to an engagement element 60 is constituted by a regulating valve 62 for regulating a line pressure generated by a not-shown oil pump by means of pressure reduction control and outputting as an output pressure Po and a switching valve 61 for switching the output pressure Po generated by the regulating valve 62 to the line pressure and outputting as the engagement element pressure Pc to the engagement element 60.

The regulating valve 62 uses a solenoid pressure (SOL pressure) and the output pressure Po as operation signal pressures and regulates the line pressure from zero pressure to a maximum pressure.

In the switching valve 61, one end of a spool is biased by a spring 63, and the output pressure Po is applied to the other end of the spool. If a pressing force generated by the output pressure Po from the regulating valve 62 exceeds a pressing force generated by the spring 63, the switching valve 61 is a valve that switches to take a position to supply the line pressure to the engagement element 60.

Therefore, as seen from oil pressure characteristics of the engagement element pressure Pc shown in FIG. 14, a gain is controlled by a small proportional characteristics till the engagement element pressure Pc reaches a set switching pressure Pco, and if the engagement element pressure Pc becomes higher than the set switching pressure Pco, the gain instantly rises to reach the line pressure by a switching operation of the switching valve 61.

In short, an accurate oil pressure control can be performed by proportional characteristics of a small gain in the shift transition period, and the engagement element pressure Pc is changed to the line pressure after shift termination, whereby torque capacity required for keeping engagement can be ensured (for example, Japanese Laid-Open Patent Publication No. 2001-12588).

If oil pressure is supplied at the time of requirement of drain of oil pressure or is drained at the time of requirement of supply of oil pressure due to a failure of a hydraulic control device, clutches or brakes are engaged or disengaged inversely with control of the hydraulic control device to be brought into an interlocked state or a neutral state. However, an oil pressure switch 65 for detecting oil pressure condition of the engagement element pressure Pc is provided to a supply oil path for supplying the engagement element pressure Pc to the engagement element 60, whereby supply or drain of the oil pressure is detected so that a control to avoid an improper supply or drain of the oil pressure can be performed.

However, in this conventional hydraulic control device for the automatic transmission, once the engagement element is engaged, line pressure is supplied directly to the engagement element. Oil pressure including hydraulic vibration acts on the engagement element, and an effective value of the oil pressure including vibration actually determines the torque transmission capacity of the clutch. Therefore, if hydraulic vibration occurring due to the structure of the oil pump is included in the line pressure, the hydraulic vibration is directly applied to the oil pressure switch.

A mean value of the oil pressure including vibration is called an effective pressure. In the case of high-frequency hydraulic vibration, even if the effective pressure of the oil pressure applied to the engagement element is low, a momentary high pressure exceeding an allowable pressure which is allowed as an input oil pressure to the oil pressure switch acts on that oil pressure switch due to action of the hydraulic vibration. Since the oil pressure switch and peripheral hydraulic circuits thereof are configured to have a high responsiveness, the direct application of the hydraulic vibration exceeding the allowable pressure to the oil pressure switch causes a failure thereof.

SUMMARY OF THE INVENTION

The present invention has been made in view of the aforementioned problem, and it is therefore an object of the present invention to provide a hydraulic control device for an automatic transmission, which prevents hydraulic vibration of line pressure from affecting an oil pressure switch for detecting oil pressure of engagement elements.

The present invention provides a hydraulic control device for an automatic transmission that comprises an engagement element pressure control section for controlling an engagement element pressure, engagement elements that are switched to an engagement state, a disengagement state and a shifting state that is a transition from the engagement state to the disengagement state or from the disengagement state to the engagement state by the controlled engagement element pressure, to achieve gear positions by engaging or disengaging the engagement elements, and an oil pressure switches provided in oil supply paths of the engagement element pressure, said engagement element pressure control section controls the engagement element pressure with a first gain when the engagement elements are in the shifting state and controls the engagement element pressure with a second gain when the engagement elements are in the engagement state.

According to the present invention, since the engagement element pressure control section controls the engagement element pressure with the second gain when the engagement elements are in the engagement state, hydraulic vibration is reduced by regulation of the engagement element pressure control section even if the hydraulic vibration is included in line pressure served as a reference pressure of the engagement element pressure. Therefore, since the engagement element pressure of which hydraulic vibration is reduced is supplied to the engagement elements, oil pressure including great hydraulic vibration is not applied to the oil pressure switch provided in the oil supply path of the engagement element pressure, and failure resulting from deterioration of the durability of the oil pressure switch is not caused.

The above and further objects and features of the invention will be more fully apparent from the following description when the same is considered with reference to the accompanying drawings.

BRIEF DESCRIPTION OF THE DRAWINGS

FIG. 2 is an engagement logic explanatory view showing a relationship between engagement of frictional engagement elements for gear change and a selected gear position.

DETAILED DESCRIPTION OF THE PREFERRED EMBODIMENT

A preferred embodiment of the present invention will be described hereinbelow.

Figure 1:
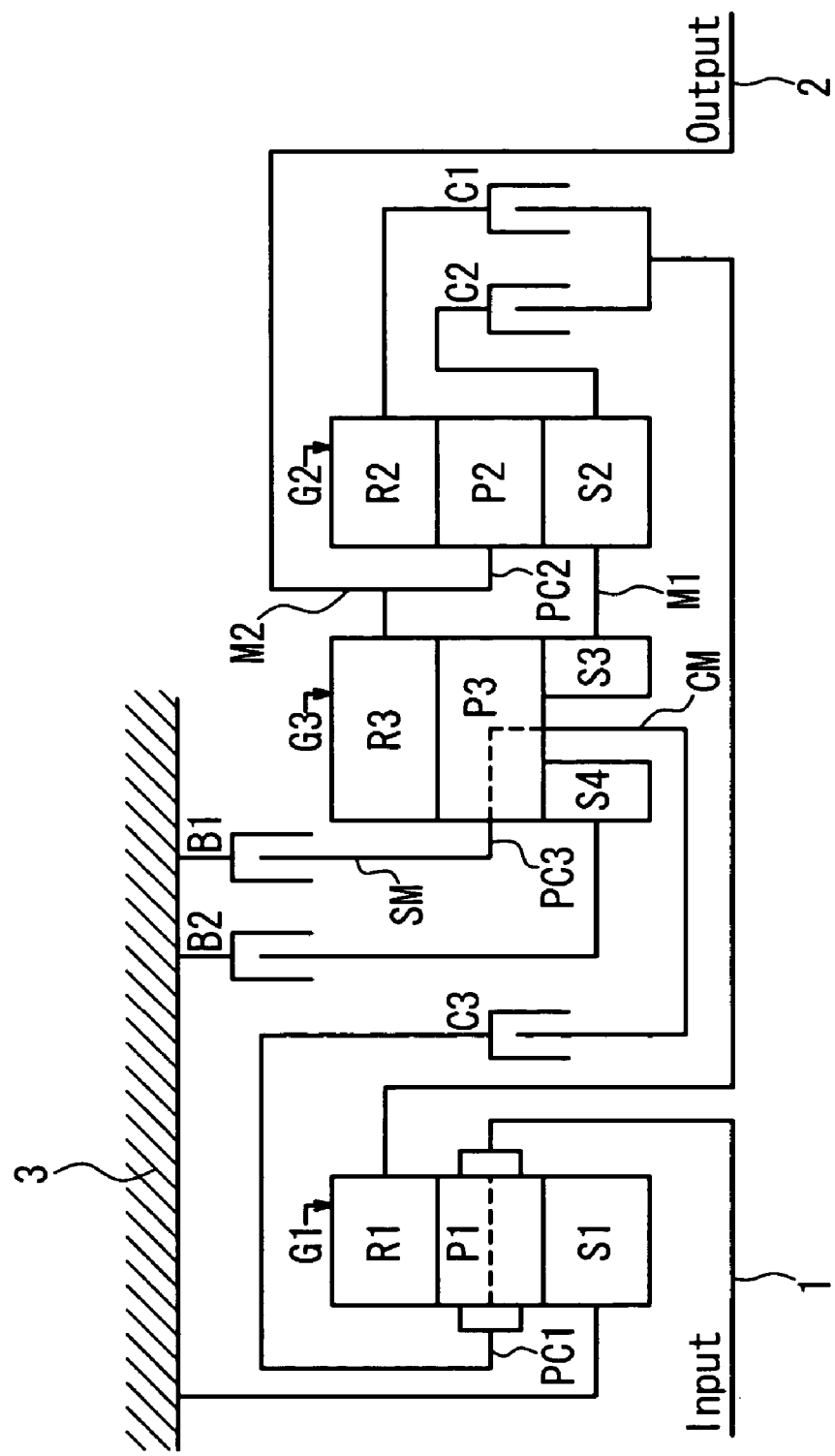
FIG. 1 is a skeleton diagram showing an embodiment of the present invention.

FIG. 1 schematically shows an automatic transmission in this embodiment.

In the automatic transmission (speed reduction double pinion type), a first planetary gear set G1 comprised of a single pinion type planetary gear set and served as a reduction gear, a third planetary gear set G3 of a double sun gear type and a second planetary gear set G2 of a single pinion type are coaxially arranged in these order from a side close to an input shaft 1 (Input). The first planetary gear set G1 constitutes a speed reduction planetary gear set, and the second planetary gear set G2 and the third planetary gear set G3 constitute a speed change planetary gear set (occasionally referred to as Ishimaru-type planetary gear train hereinafter).

The first planetary gear set G1 is comprised of a single pinion type planetary gear set having a first sun gear S1, a first ring gear R1 and a first carrier PC1 for rotatably supporting a first pinion P1 engaging with these gears S1, R1.

The second planetary gear set G2 is comprised of a single pinion type planetary gear set having a second sun gear S2, a second ring gear R2 and a second carrier PC2 for rotatably supporting a second pinion P2 engaging with these gears S2, R2.

The third planetary gear set G3 is comprised of a double sun gear type planetary gear set having a fourth sun gear S4 on the side close to the input shaft 1, a third sun gear S3 on the side distant from the input shaft 1, a third pinion P3 engaging with these sun gears S3, S4 respectively, a third carrier PC3 for rotatably supporting the third pinion P3 and a third ring gear R3 engaging with the third pinion P3.

The third sun gear S3 and fourth sun gear S4 are arranged coaxially, but their number of teeth need not necessarily be equal. The third carrier PC3 is provided with a center member CM connected thereto and extending inward in the radial direction through a space between the sun gears S3, S4 and a side member SM extending from the third carrier PC3 outward in the radial direction.

The center member CM is integrated with the third carrier PC3 and located on an arrangement pitch circle of the third pinion P3 so as to pass through a space defined between the third pinion P3 adjacent to each other and extend inward in the radial direction through a space between the sun gears S3, S4.

The input shaft 1 is connected to a not-shown engine as a power source through a not-shown torque converter. Moreover, the input shaft 1 is connected to the first carrier PC1, and rotation of the engine is inputted from the input shaft 1 to the first carrier PC1.

An output shaft 2 is connected to a second coupling member M2 to which the second carrier PC2 and the third ring gear R3 are connected, and transmission output rotation outputted from the output shaft 2 is transmitted to a drive wheel of a vehicle through not-shown final gear set and differential gear device.

In addition, the second sun gear S2 and the third sun gear S3 are integrally connected by a first coupling member M1.

The first sun gear S1 of the speed reduction planetary gear set G1 is connected to a transmission casing 3 so as to be fixed at all times, the first ring gear R1 can be connected to the second ring gear R2 by means of a first clutch C1 and to the second sung gear S2 by means of a second clutch C2.

The center member CM of the third carrier PC3 can be connected to the input shaft 1 by means of the third clutch C3 through the first carrier PC1.

In the double sun gear type planetary gear set G3, the side member SM of the third carrier PC3 can be connected to the transmission casing 3 by means of a first brake B1 so as to fix the third carrier PC3, and the fourth sun gear S4 can be connected to the transmission casing 3 by means of a second brake B2 so as to fix the fourth sun gear S4.

In the automatic transmission constructed thus, by engaging (indicated by circle mark) or releasing (no mark) the clutches C1, C2, C3 and the brakes B1, B2 in the combination shown in FIG. 2, corresponding gear positions (forward first to sixth speed and reverse) can be selected, and an hydraulic control circuit (not-shown) for realizing an engagement logic for this shifting is connected to these clutches and brakes.

The hydraulic control circuit of shift control may be of the hydraulically controlled type, the electronically controlled type, or the combined type having the features of the two.

Shift operation of the above automatic transmission will be described with reference to FIG. 2 to FIG. 6b.

Figure 3:
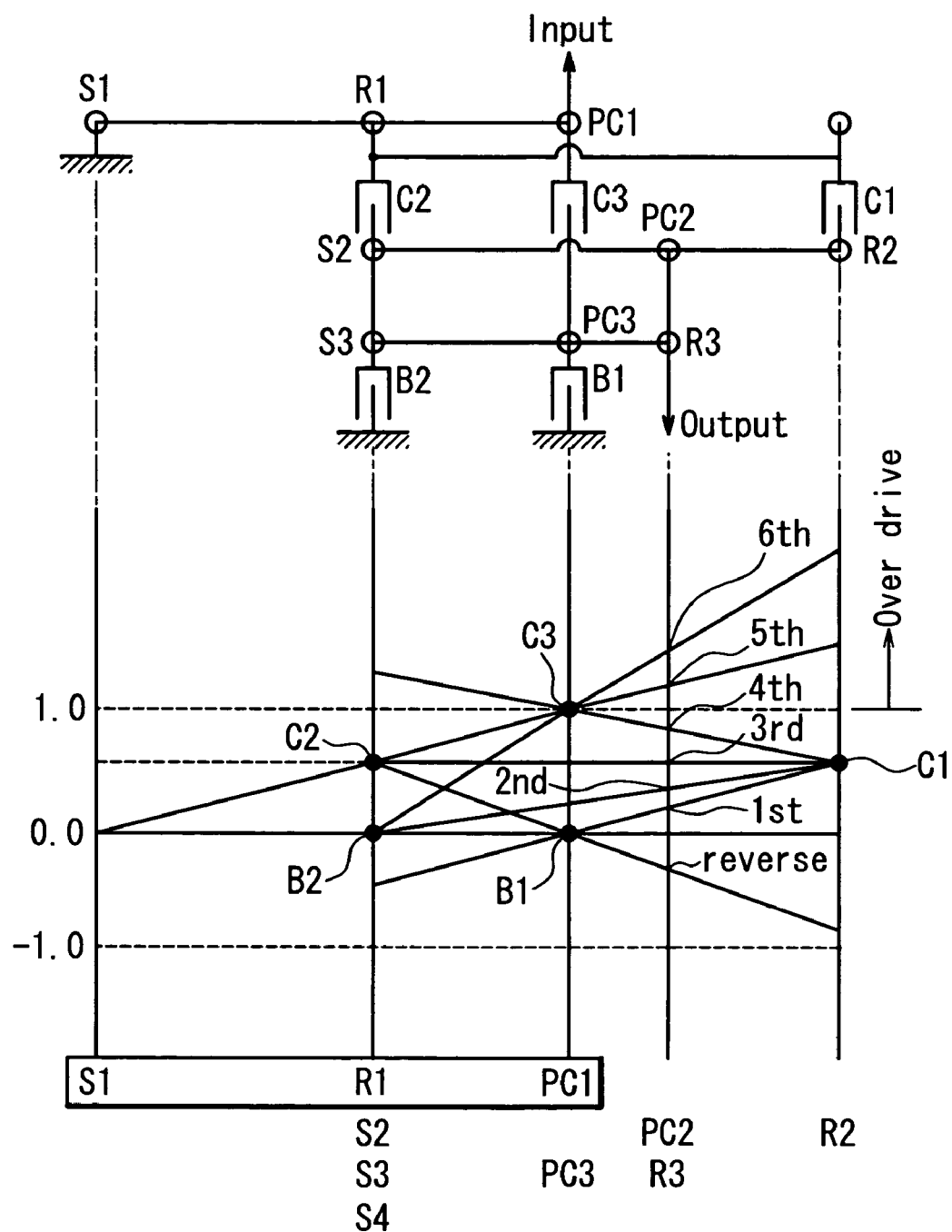
FIG. 3 is an alignment chart showing a gear changing state for each selected gear position.

FIG. 3 is an alignment chart showing rotation states for each speed of rotary members in the respective planetary gear sets G1, G2, G3, and FIG. 4a to FIG. 6b are diagrams showing torque transmission passage for each speed.

In FIG. 4a to FIG. 6b, the bold lines indicate the torque transmission passage of the clutches, brakes and members, and the hatching indicates gears involved in torque transmission.

(First Speed)

As shown in FIG. 2, the forward first speed (1st) is obtained by engagement of the first clutch C1 and the first brake B1.

At this first speed, in the second planetary gear set G2, reduction rotation of the first planetary gear set G1 is inputted to the second ring gear R2 by engagement of the first clutch C1.

On the other hand, in the third planetary gear set G3, since engagement of the first brake B1 causes the third carrier PC3 to be fixed to the transmission casing 3, the third sun gear S3 produces reduction rotation of the reverse direction with respect to output rotation from the third ring gear R3. This rotation of the third sun gear S3 is transmitted to the second sun gear S2 of the second planetary gear set G2 through the first coupling member M1.

Thus, the second planetary gear set G2 receives the reduction rotation of the forward direction from the second ring gear R2 and the reduction rotation of the reverse direction from the second sun gear S2. Rotation obtained by further decreasing the reduction rotation of the second ring gear R2 is outputted from the second carrier PC2 to the output shaft 2 through the second coupling member M2.

As shown in the alignment chart of FIG. 3, that is, the first speed is defined by the line connecting an engagement point of the first clutch C1 where reduction rotation from the first planetary gear set G1 is inputted to the second ring gear R2 and an engagement point of the first brake B1 where rotation of the third carrier PC3 is stopped, and rotation inputted from the input shaft 1 is reduced and outputted from the output shaft 2.

Figure 4A:
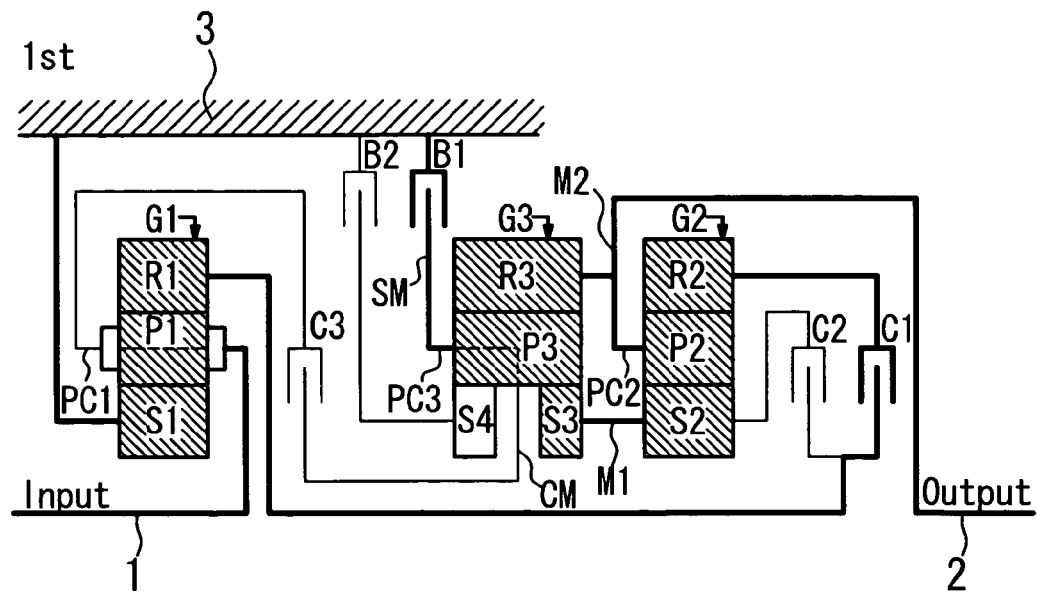
FIG. 4a is a skeleton diagram showing a torque transmission passage during a running at the forward first speed.

As shown in FIG. 4a, in the torque transmission passage at the first speed, torque is applied to the first clutch C1, the first brake B1 and the respective members indicated by the bold line, and the first planetary gear set G1, the second planetary gear set G2 and the third planetary gear set G3 (except the fourth sun gear S4) indicated by the hatching.

In short, at the first speed, the first planetary gear set G1 and the second and third planetary gear sets G2, G3 constituting the Ishimaru-type planetary gear train are involved in torque transmission.

(Second Speed)

As shown in FIG. 2, second speed (2nd) is obtained by releasing the first brake B1 engaged at the first speed and engaging the second brake B2, that is, by engaging the first clutch C1 and the second brake B2.

At this second speed, in the second planetary gear set G2, reduction rotation from the first planetary gear set G1 is inputted to the second ring gear R2 by engagement of the first clutch C1.

On the other hand, since in the third planetary gear set G3, the fourth sun gear S4 is fixed to the casing by engagement of the second brake B2, the third sun gear S3 coupled to the third pinion P3 is fixed. Thereby, the second sun gear S2 coupled to the third sun gear S3 through the first coupling member M1 is fixed to the transmission casing 3.

Thus, the second planetary gear set G2 receives reduction rotation of the forward direction from the second ring gear R2 to fix the second sun gear S2, and rotation obtained by reducing the reduction rotation from the ring gear R2 is outputted from the second carrier PC2 to the output shaft 2 through the second coupling member M2.

That is, as shown in the alignment chart of FIG. 3, the second speed is defined by the line connecting an engagement point of the first clutch C1 where reduction rotation from the first planetary gear set G1 is input to the second ring gear R2 and an engagement point of the second brake B2 where rotation of the fourth sun gear S4 is stopped, and rotation inputted from the input shaft 1 is reduced (incidentally, higher than the first speed) and outputted from the output shaft 2.

Figure 4B:
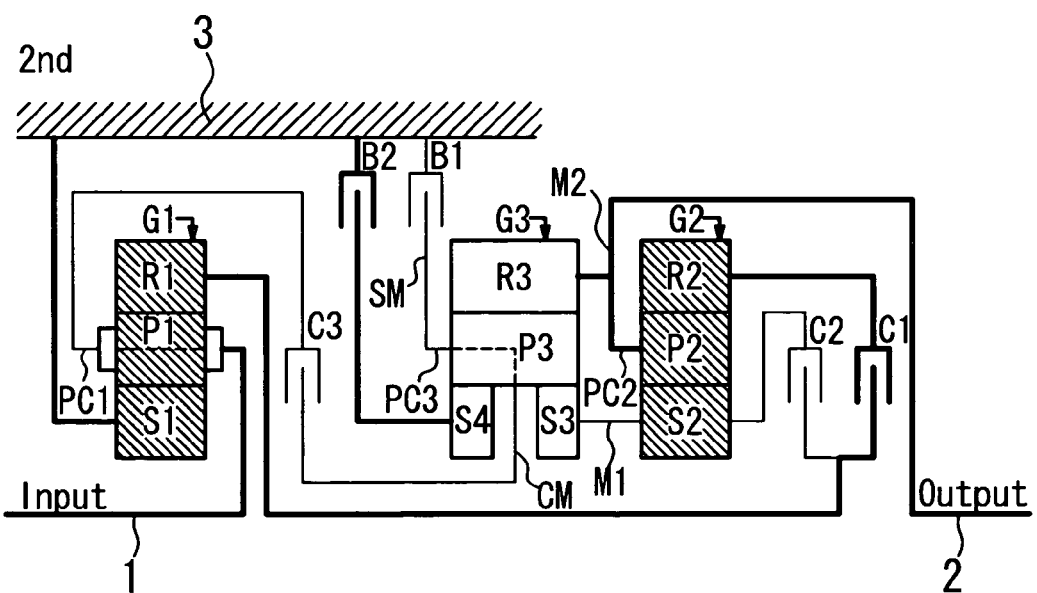
FIG. 4b is a skeleton diagram showing a torque transmission passage during a running at the forward second speed.

The torque transmission passage at this second speed is as shown in FIG. 4b, and torque is applied to the first clutch C1, the second brake B2 and the respective members that are indicated by the bold lines and the first and second planetary gear sets G1, G2 that are indicated by the hatching.

In the third planetary gear set G3, the non-fixed third pinion P3 merely revolves around the fixed sun gears S3, S4 with output rotation of the third ring gear R3. In short, the third planetary gear set G3 functions as a rotary member but is not involved in torque transmission.

(Third Speed)

As shown in FIG. 2, third speed (3rd) can be obtained by releasing the second brake B2 engaged at the second speed and engaging the second clutch C2, that is, engaging the first clutch C1 and the second clutch C2.

At this third speed, in the second planetary gear set G2, reduction rotation from the first planetary gear set G1 is inputted to the second ring gear R2 by the engagement of the first clutch C1. Simultaneously with this, this reduction rotation is inputted to the second sun gear S2 of the second planetary gear set G2 by the engagement of the second clutch C2.

Therefore, since the second planetary gear set G2 receives the same reduction rotation from the second ring gear R2 and the second sun gear S2, reduction rotation (same as the reduction rotation of the first planetary gear set G1) is outputted from the second carrier PC2 rotating integrally with the gears R2, S2 to the output shaft 2 through the second coupling member M2.

That is, as shown in the alignment chart of FIG. 3, the third speed is defined by the line connecting an engagement point of the first clutch C1 where reduction rotation from the first planetary gear set G1 is inputted to the second ring gear R2 and an engagement point of the second clutch C2 where reduction rotation from the first planetary gear set G1 is inputted to the second sun gear S2, and rotation inputted from the input shaft is reduced (equal to reduction ratio of the first planetary gear set G1) and outputted from the output shaft 2.

Figure 5A:
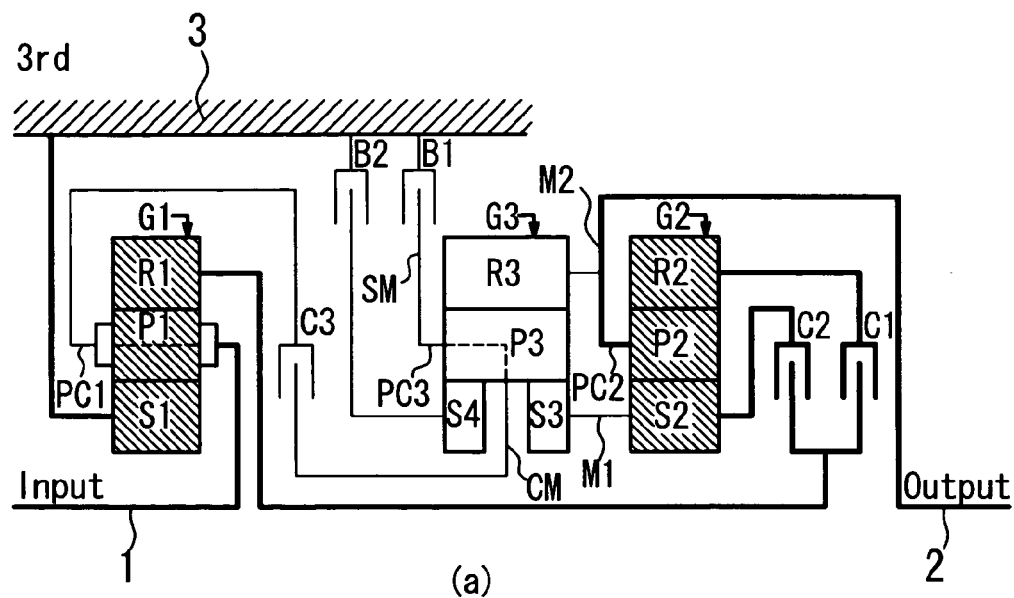
FIG. 5a is a skeleton diagram showing a torque transmission passage during a running at the forward third speed.

A torque transmission passage at third speed is as shown in FIG. 5a, and torque is applied to the first clutch C1, the second clutch C2 and the respective members indicated by the bold line and the first and second planetary gear sets G1, G2 indicated by the hatching. In short, the third planetary gear set G3 is not involved in torque transmission.

(Fourth Speed)

As shown in FIG. 2, fourth speed (4th) is obtained by releasing the second clutch C2 engaged at the third speed and engaging the third clutch C3, that is, engaging the first clutch C1 and the third clutch C3.

At this fourth speed, in the second planetary gear set G2, reduction rotation from the first planetary gear set G1 is inputted to the second ring gear R2 by engagement of the first clutch C1.

On the other hand, in the third planetary gear set G3, input rotation from the input shaft 1 is inputted to the third carrier PC3 through the center member CM by engagement of the third clutch C3.

Thereby, rotation of the third sun gear S3 is increased to become higher than output rotation of the third ring gear R3, and the increased rotation of the third sun gear S3 is transmitted to the second sun gear S2 through the first coupling member M1.

Thus, the second planetary gear set G2 receives reduction rotation from the second ring gear R2 and increased rotation from the second sun gear S2, and rotation (incidentally, lower than input rotation) obtained by increasing the reduction rotation from the second ring gear R2 is outputted from the second carrier PC2 to the output shaft 2 through the second coupling member M2.

That is, as shown in the alignment chart of FIG. 3, the fourth speed is defined by the line connecting an engagement point of the first clutch C1 where reduction rotation from the first planetary gear set G1 is inputted to the second ring gear R2 and an engagement point of the third clutch C3 where rotation from the third carrier PC3 acts as input rotation, and rotation inputted from the input shaft 1 is slightly reduced and outputted from the output shaft 2.

Figure 5B:
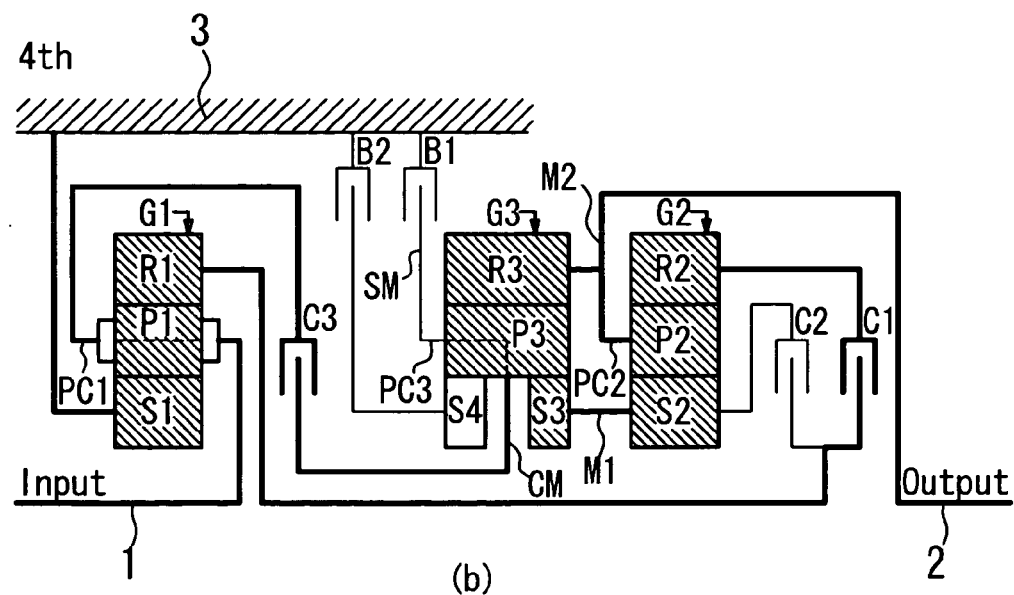
FIG. 5b is a skeleton diagram showing a torque transmission passage during a running at the forward fourth speed.

A torque transmission passage at the fourth speed is as shown in FIG. 5b, and torque is applied to the first clutch C1, the third clutch C3 and the respective members indicated by the bold line and the first, second, and third planetary gear sets G1, G2, G3 (except the fourth sun gear S4) indicated by the hatching.

(Fifth Speed)

As shown in FIG. 2, fifth speed (5th) is obtained by releasing the first clutch C1 engaged at the fourth speed and engaging the second clutch C2, that is, engaging the second clutch C2 and the third clutch C3.

At this fifth speed, reduction rotation from the first planetary gear set G1 is inputted to the third sun gear S3 through the second sun gear S2 and the first coupling member M1 by engagement of the second clutch C2. Simultaneously, rotation inputted from the input shaft 1 is inputted to the third carrier PC3 through the center member CM by the engagement of the third clutch C3.

Thereby, in the third planetary gear set G3, input rotation is inputted to the third carrier PC3, reduction rotation from the first planetary gear set G1 is inputted to the third sun gear S3, and rotation higher than the input rotation is outputted from the third ring gear R3 to the output shaft 2 through the second coupling member M2.

That is, as shown in the alignment chart of FIG. 3, the fifth speed is defined by the line connecting an engagement point of the second cutch C2 where reduction rotation from the first planetary gear set G1 is inputted to the third sun gear S3 and an engagement point of the third clutch C3 where rotation of the third carrier PC3 acts as input rotation, and rotation inputted from the input shaft 1 is slightly increased and outputted from the output shaft 2.

Figure 6A:
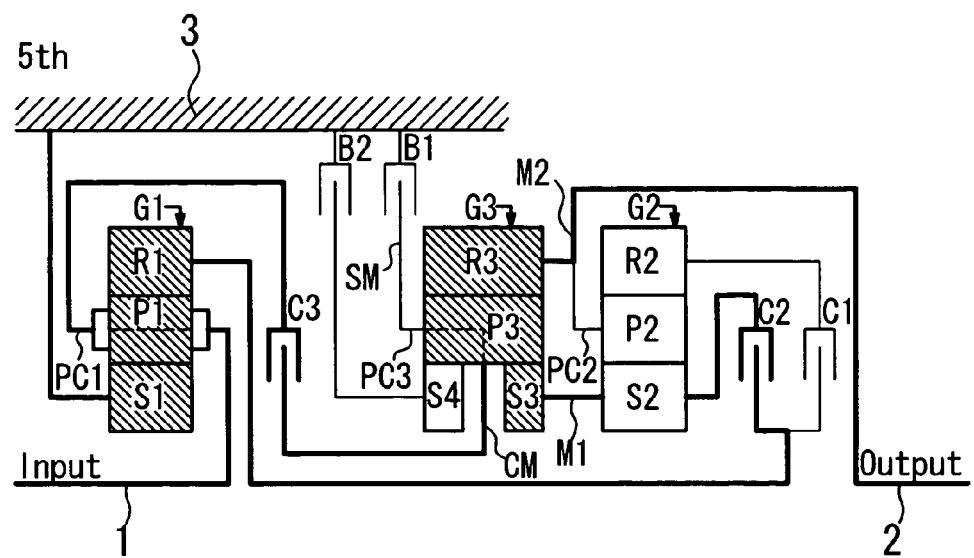
FIG. 6a is a skeleton diagram showing a torque transmission passage during a running at the forward fifth speed.

A torque transmission passage at the fifth speed is as shown in FIG. 6a, and torque is applied to the second clutch C2, the third clutch C3 and the respective members indicated by the bold line and the first and third planetary gear sets G1, G3 (except the fourth sun gear S4) indicated by the hatching.

(Sixth Speed)

As shown in FIG. 2, sixth speed (6th) is obtained by releasing the second clutch C2 engaged at the fifth speed and engaging the second brake B2, that is, engaging the third clutch C3 and the second brake B2.

At this sixth speed, input rotation from the input shaft 1 is inputted to the third carrier PC3 through the center member CM of the third planetary gear set G3 by the engagement of the third clutch C3.

By the engagement of the second brake B2, moreover, the fourth sun gear S4 of the third planetary gear set G3 is fixed to the transmission casing 3.

Thus, in the third planetary gear set G3, input rotation is inputted to the third carrier PC3, and the fourth sun gear S4 is fixed to the transmission casing 3, whereby rotation higher than input rotation is outputted from the third ring gear R3 to the output shaft 2 through the second coupling member M2.

That is, as shown in the alignment chart of FIG. 3, the sixth speed is defined by the line connecting an engagement point of the third clutch C3 where rotation of the third carrier PC3 acts as input rotation and an engagement point of the second brake B2 where the fourth sun gear S4 is fixed to the transmission casing 3, and rotation inputted from the input shaft is increased and outputted from the output shaft 2.

Figure 6B:
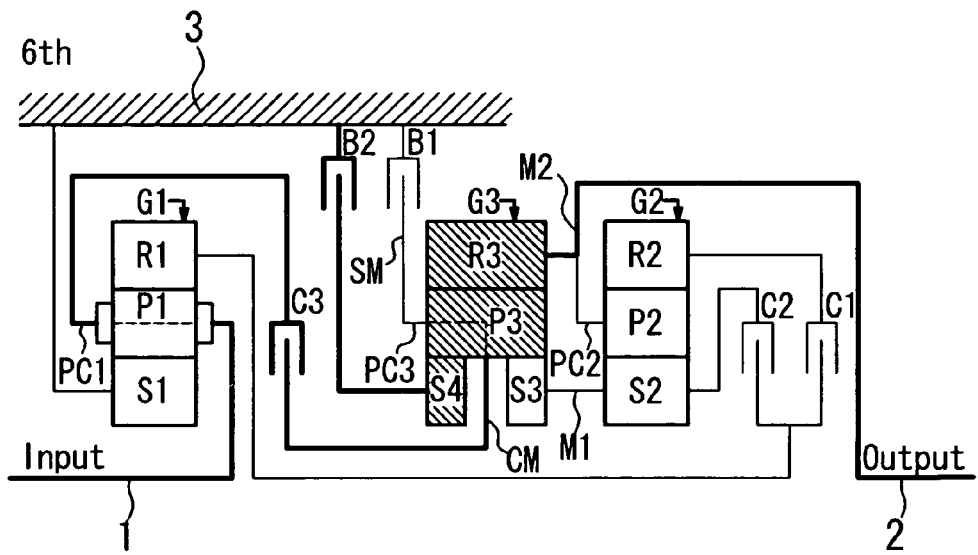
FIG. 6b is a skeleton diagram showing a torque transmission passage during a running at the forward sixth speed.

A torque transmission passage at the sixth speed is as shown in FIG. 6b, and torque is applied to the third clutch C3, the second brake B2 and the respective members indicated by the bold line and the third planetary gear set G3 (except the third sun gear S3) indicated by the hatching.

(Reverse)

As shown in FIG. 2, reverse gear speed is obtained by engaging the second clutch C2 and the first brake B1.

At this reverse gear speed, by engagement of the second clutch C2, reduction rotation from the first planetary gear set G1 is inputted to the third sun gear S3 through the second sun gear S2 and the first coupling member M1. Moreover, by engagement of the first brake B1, the third carrier PC3 is fixed to the transmission casing 3.

In the third planetary gear set G3, therefore, reduction rotation of the forward direction is inputted to the third sun gear S3, the third carrier PC3 is fixed to the transmission casing 3, and reduced reverse rotation from the third ring gear R3 is outputted to the output shaft 2 through the second coupling member M2.

That is, as shown in the alignment chart of FIG. 3, reverse gear speed is defined by the line connecting an engagement point of the second cutch C2 where reduction rotation of the first planetary gear set G1 is inputted to the third sun gear S3 and an engagement point of the first brake B1 where rotation of the third carrier PC3 is stopped, and rotation inputted from the input shaft 1 is reduced in the reverse direction and outputted from the output shaft 2.

Figure 7:
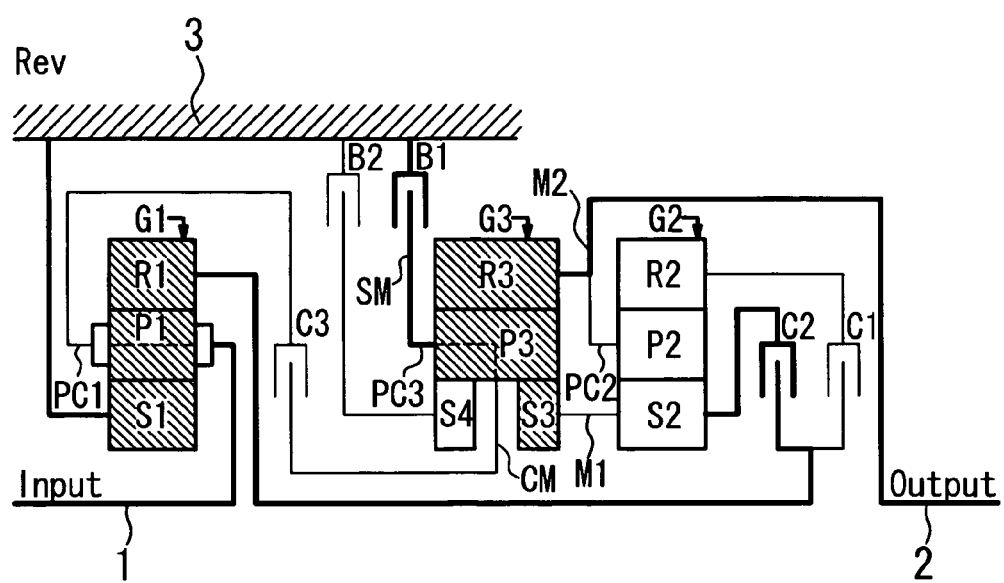
FIG. 7 is a skeleton diagram showing a torque transmission passage at the time of selection of reverse gear positions.

A torque transmission passage at this reverse gear speed is as shown in FIG. 7, torque is applied to the second clutch C2, the first brake B1, and the respective members indicated by the bold line and the first and third planetary gear sets G1, G3 (except the fourth sun gear S4) indicated by the hatching.

Figure 8:
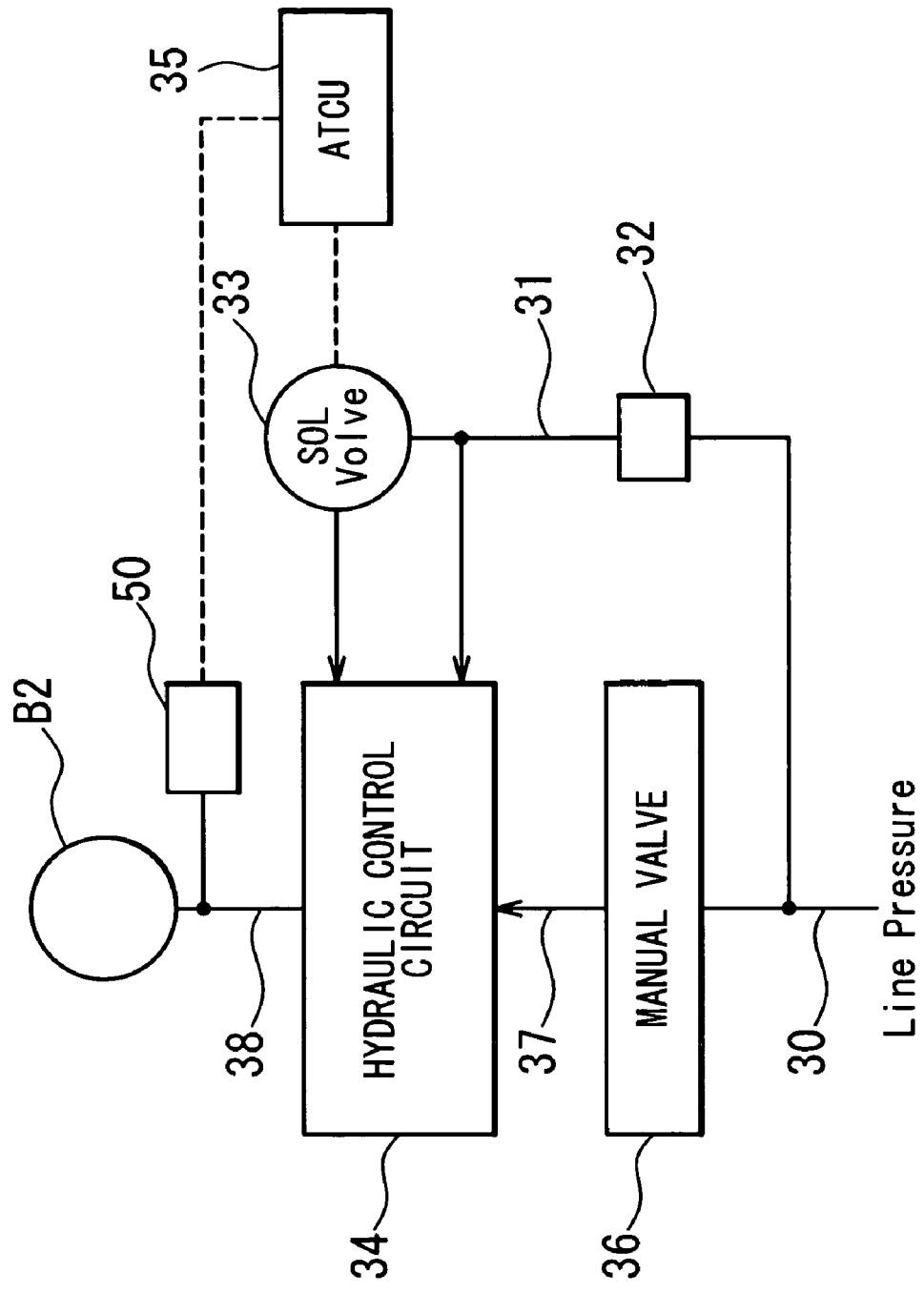
FIG. 8 is a diagram showing an oil pressure control system of a second brake.

FIG. 8 shows a hydraulic control system for actuating the engagement elements.

Incidentally, the drawing representatively shows only the hydraulic control system of the second brake B2, and the first brake B1, the first clutch C1, the second clutch C2 and the third clutch C3 are also actuated by a system having the same construction as that of the hydraulic control system in the second brake B2.

Line pressure generated by a not-shown oil pump is supplied through a line pressure oil path 30 to a manual valve 36 and a pilot valve 32.

The manual valve 36 is a valve that is switched by an operation of a not-shown select lever by a vehicle's driver, whereby the line pressure oil path 30 and a D range pressure oil path 37 are connected in a D range, and the line pressure oil path 30 and a not-shown R range oil path are connected in an R range.

The pilot valve 32 provides control to reduce the line pressure from the line pressure oil path 30 to a predetermined pilot pressure. Generated pilot pressure is supplied through a pilot pressure oil path 31 to a solenoid valve (SOL valve) 33 and a hydraulic control circuit 34.

To the solenoid valve 33 an AT control unit (ATCU) 35 is connected. The AT control unit 35 receives switch signals showing oil pressure conditions of each brake or clutch from an oil pressure switch 50 that is provided in an oil path connected to the second brake B2 or in oil paths connected to other not-shown engagement elements.

At the time of speed change, the AT control unit 35 outputs a drive signal to the solenoid valve 33 at a predetermined timing according to an inputted switch signal.

The solenoid valve 33 regulates pilot pressure according to the drive signal from the AT control unit 35 to generate solenoid pressure and supplies the solenoid pressure to the hydraulic control circuit 34.

The hydraulic control circuit 34 regulates line pressure inputted through the D range pressure oil path 37 to generate a second brake pressure. The second brake pressure is supplied through a second brake pressure oil path 38 to the second brake B2.

Figure 9:
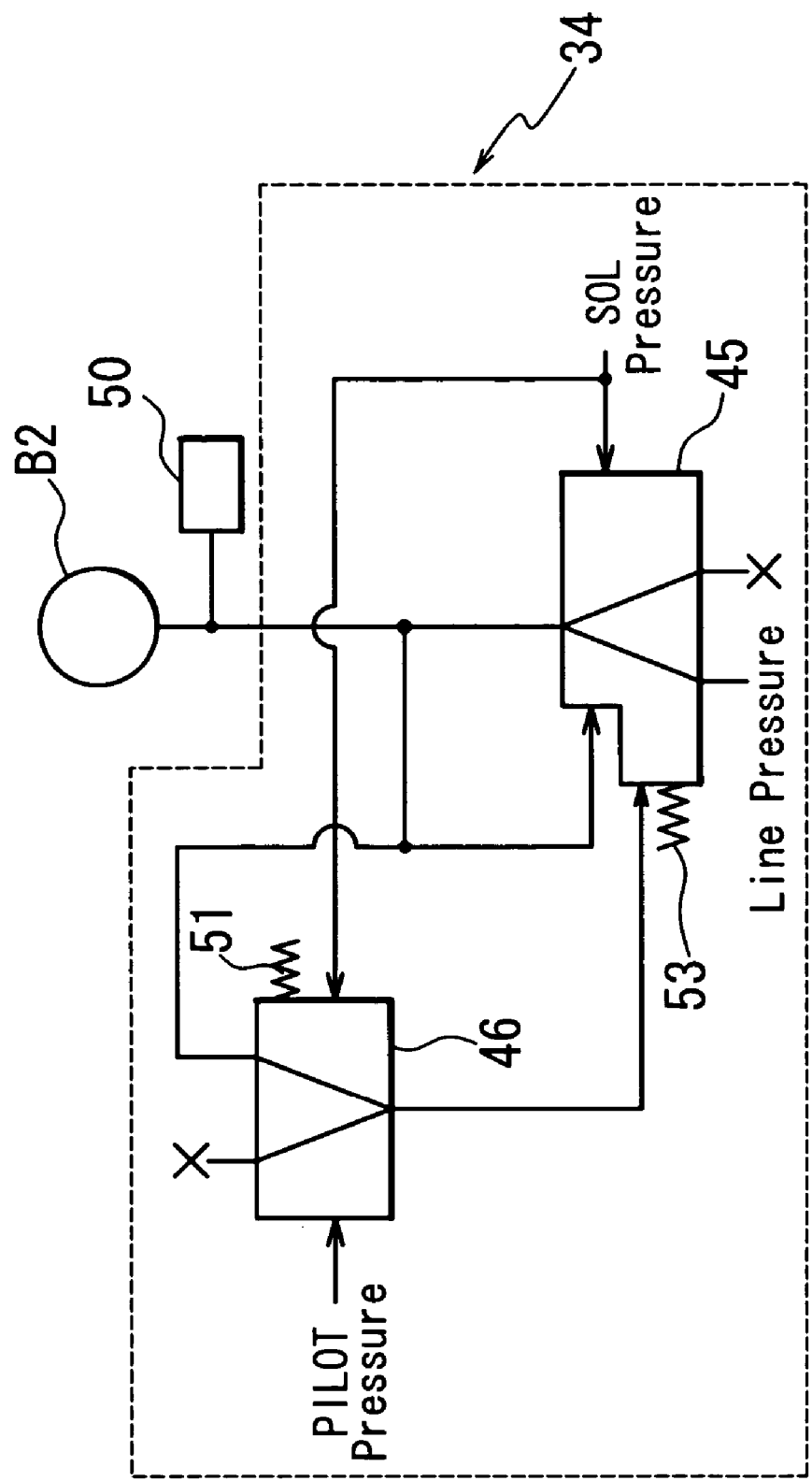
FIG. 9 is a diagram showing the detail of a hydraulic control circuit.

The hydraulic control circuit 34 will be explained in detail with reference to FIG. 9.

The hydraulic control circuit 34 has a regulating valve 45 for regulating line pressure and a switching valve 46 for switching ON and OFF of passing of oil pressure acting on a spool of the regulating valve 45.

The solenoid pressure (SOL pressure) is applied to one end of the spool of the regulating valve 45. Moreover, the other end of the spool of the regulating valve 45 has two pressure receiving surfaces, the second brake pressure outputted from the regulating valve 45 is applied to one surface, and the second brake pressure wherein ON and OFF of passing are switched by the switching valve 46 according to the solenoid pressure is applied to the other surface. Further, a pressing force of a spring 53 acts on the other end of spool.

To one end of a spool of the switching valve 46 a pilot pressure regulated by the pilot valve 32 is applied, and to the other end a spring 51 and the solenoid pressure are applied.

When the solenoid pressure is low, the second brake pressure outputted from the regulating valve 45 is applied to the other end of the regulating valve 45, and further the second brake pressure passed through the switching valve 46 is applied to the other end of the regulating valve 45. A state of the regulating valve 45 at this time is set as a Low gain state.

When the solenoid pressure is increased and the solenoid pressure and pressing force of the spring 51 exceed the pilot pressure, the spool of the switching valve 46 is moved to stop the output of the second brake pressure from the switching valve 46, and one of two oil pressure applied to the other end of the spool of the regulating valve 45 is blocked. A state of the regulating valve 45 at this time is set as a Hi gain state.

Figure 10:
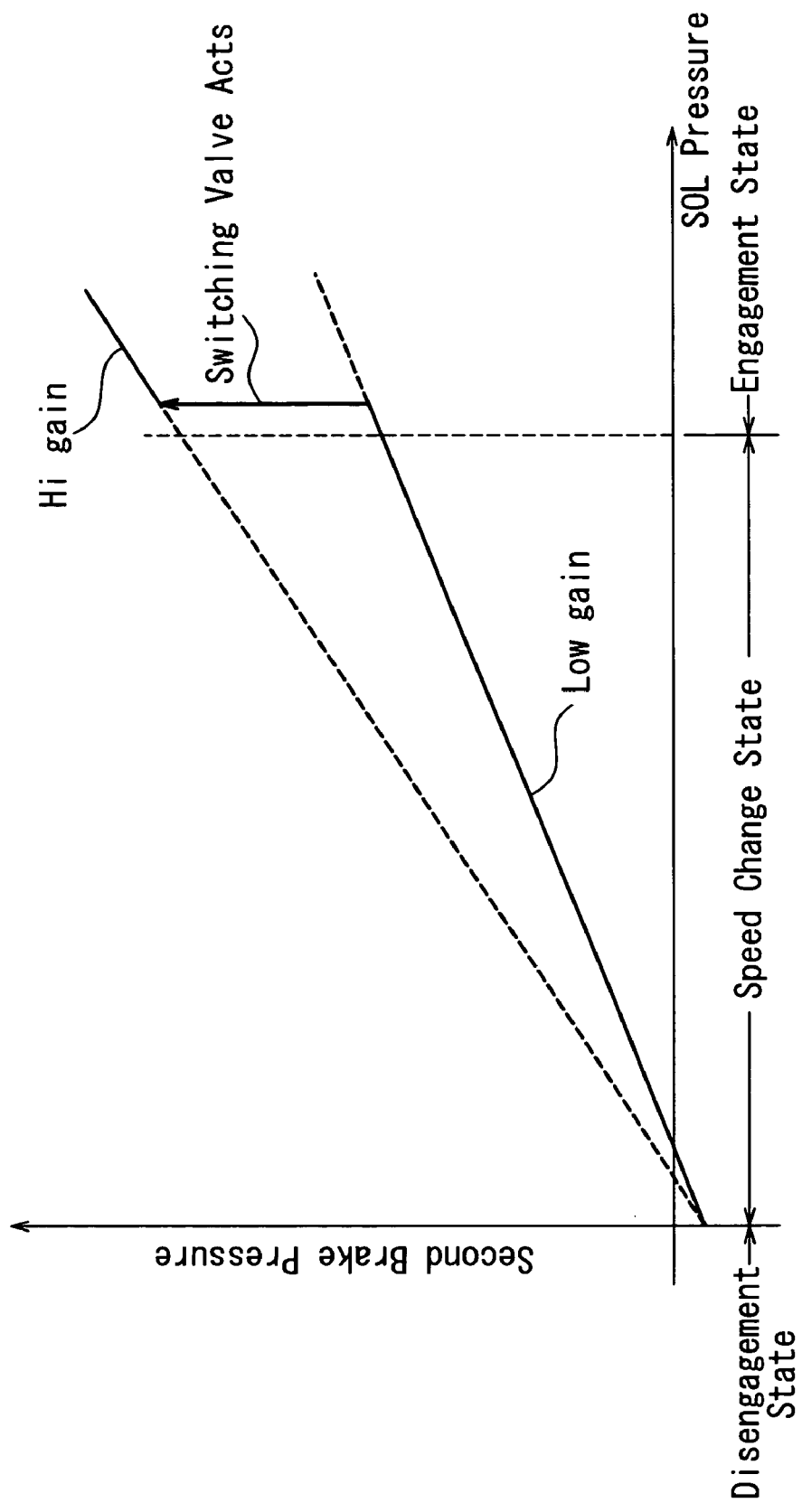
FIG. 10 is a diagram showing change characteristics of a second brake pressure.

FIG. 10 shows change characteristics of the second brake pressure outputted from the regulating valve 45.

First, a change of the second brake pressure in the case where the solenoid pressure supplied to the regulating valve 45 is increased, that is, the second brake B2 is changed from a shifting state to engagement state will be explained.

When the solenoid pressure is low, the regulating valve 45 is in the Low gain state and increases the second brake pressure with a gentle slope together with increase of the solenoid pressure. Oil pressure controlled with a Low gain in the. regulating valve 45 controls engagement of the brakes at the time of speed changes.

When the solenoid pressure is further increased after the solenoid pressure is increased and the second brake B2 is brought into the engagement state, the switching valve 46 is actuated to block passing of oil pressure (the second brake pressure), the regulating valve 45 is brought into the Hi gain state, and brake engagement pressure at a normal time is ensured to prevent slip of the brake.

When the solenoid pressure supplied to the regulating valve 45 is decreased, that is, the second brake B2 is changed from the engagement state to a speed change state, the decrease of the solenoid pressure causes the switching valve 46 to be actuated, the second brake pressure is supplied to the regulating valve 45 so that the regulating valve 45 is changed from the Hi gain state to the Low gain state, and the second brake pressure is controlled in a reduction direction with a gentle slope at the Low gain.

Thus, the second brake pressure supplied to the second brake B2 is controlled according to the solenoid pressure by using the regulating valve 45 and the switching valve 46 at the Low gain or Hi gain, whereby the engagement state of the second brake B2 can be controlled by the second brake pressure having a gentle change characteristics at the time of speed change wherein hydraulic control requires accuracy.

Moreover, since the second brake pressure supplied at the time of engagement of the brake is also regulated by the regulating valve 45, oil pressure wherein hydraulic vibration included in line pressure is reduced is applied to the second brake B2 and the oil pressure switch 50.

This embodiment is thus constructed, and when the second brake B2 (engagement element) is engaged, the regulating valve 45 of the Hi gain state regulates line pressure at the Hi gain (second gain) to generate the second brake pressure (engagement element pressure) and supply it to the second brake B2.

Thus, the regulating valve 45 regulates also oil pressure supplied when the second brake B2 is in the engagement state. Therefore, since line pressure including hydraulic vibration is not applied directly to the oil pressure switch 50 provided in the oil supply path of the second brake B2, but the second brake pressure wherein hydraulic vibration is reduced by the regulating valve 45 is applied to the oil pressure switch 50, the breakage of the oil pressure switch 50 and the deterioration of durability can be improved.

By controlling the second brake pressure at the Low gain (first gain) when the second brake B2 is in speed change state and by controlling the second brake pressure at the Hi gain (second gain) when the second brake B2 is in the engagement state, engagement of the second brake B2 can be controlled with a high accuracy by the second brake pressure.

Moreover, when the second brake B2 is brought into the engagement state, torque capacity for holding the engagement of the second brake B2 can be ensured by the second brake pressure controlled at the Hi gain.

The hydraulic control circuit 34 (engagement element pressure control section) is constituted by one regulating valve and one switching valve. As shown in FIG. 9, solenoid pressure is applied to one end of the spool of the regulating valve 45, and the second brake pressure, output oil pressure from the switching valve 46 and the spring 53 are applied to the other end of the spool of the regulating valve 45. On the other hand, pilot pressure is applied to one end of the spool of the switching valve 46, and solenoid pressure and spring force are applied to the other end of the spool of the switching valve 46. Moreover, since second brake pressure controlled at the Hi gain and Low gain according to the solenoid pressure is generated, oil pressure supplied to the second brake B2 can be generated by a compact hydraulic circuit.

Although the above embodiment describes an example of using the second brake B2 as an engagement element, the same effect as that of the case where the second brake B2 is used can be obtained even when the above hydraulic control circuit is applied to other engagement elements.

Figure 11:
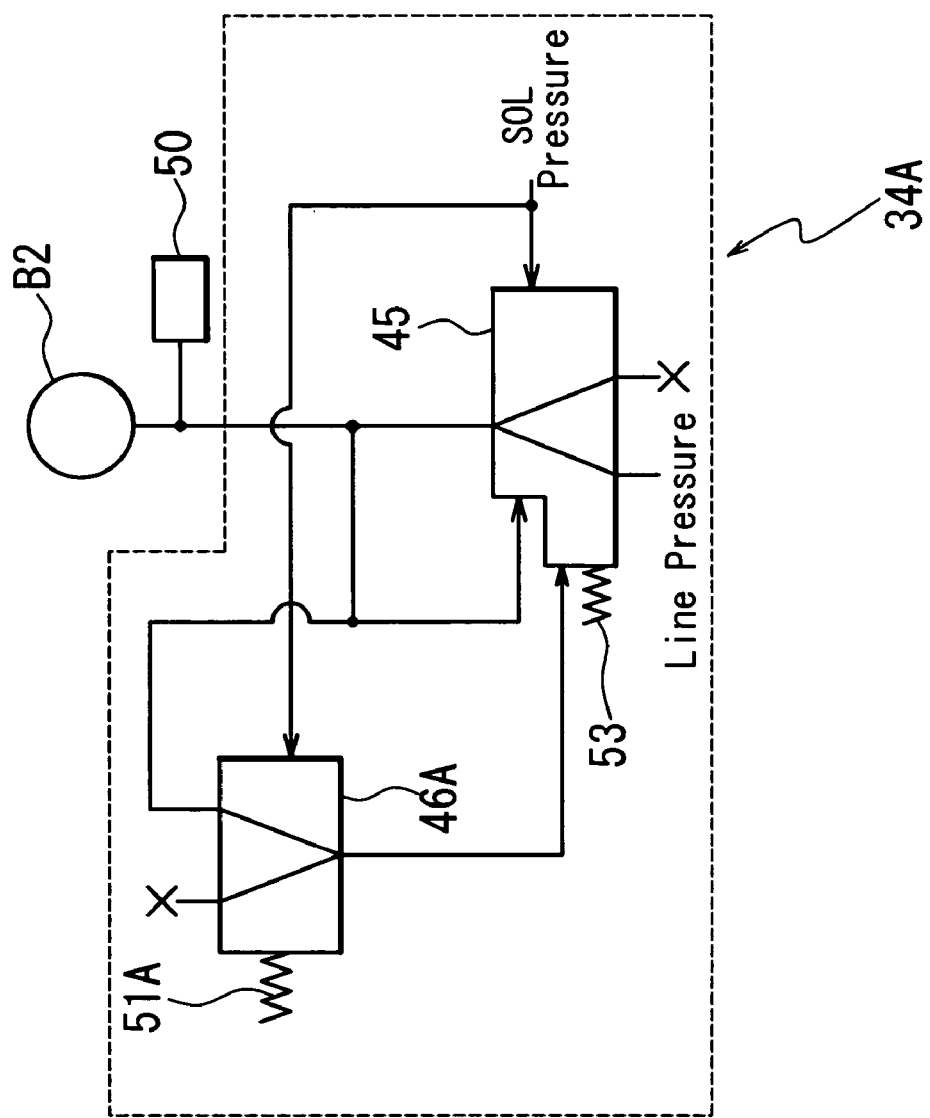
FIG. 11 is a diagram showing a modification of the hydraulic control circuit.

As the first modification, a hydraulic control circuit 34A shown in FIG. 11 maybe used instead of the hydraulic control circuit 34 of the embodiment.

The hydraulic control circuit 34A is provided with a switching valve 46A instead of the switching valve 46 of the embodiment, and the regulating valve 45 has two pressure receiving surfaces for feedback pressure (the second brake pressure) as in the embodiment.

Pressing force of a spring 51A is applied to one end of a spool of the switching valve 46A, and solenoid pressure is applied to the other end of the spool. When the solenoid pressure is increased, the spool of the switching valve 46A is moved to block second brake pressure passed through the switching valve 46A, and the regulating valve 45 is brought into the Hi gain state. Therefore, as in the embodiment, the second brake pressure outputted from the regulating valve 45 is controlled at the High gain and Low gain according to change of the solenoid pressure as shown in FIG. 10.

Thus, since the second brake pressure (engagement element pressure) can be controlled by switching the Hi gain (second gain) and Low gain (first gain) by use of one regulating valve and one switching valve, a compact hydraulic circuit can be realized.

Figure 12A:
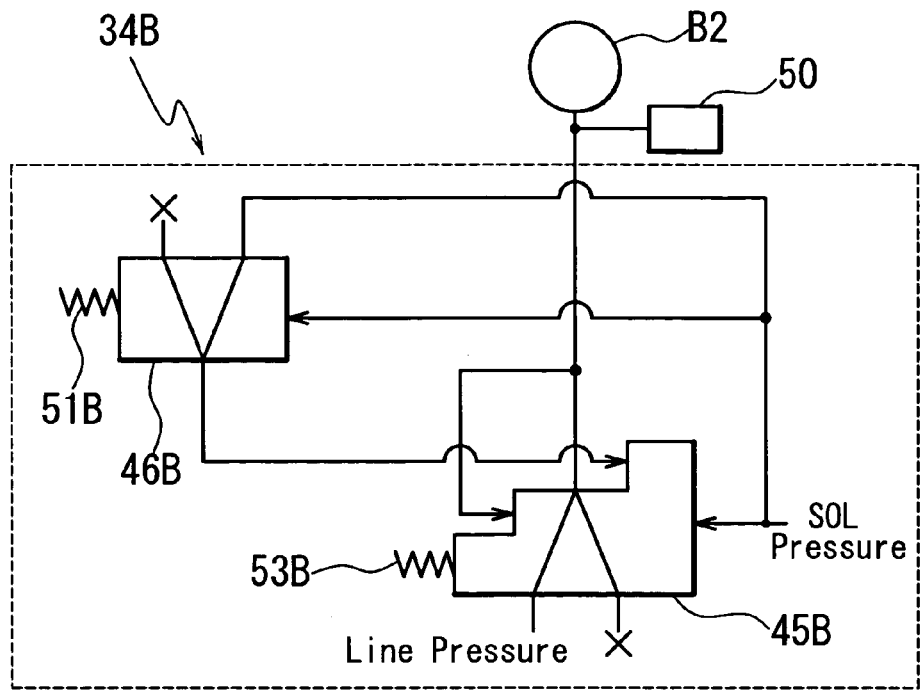
FIG. 12a is a diagram showing a modification of the hydraulic control circuit.

Further, as the second modification, a hydraulic control circuit 34B shown in FIG. 12*a* may be used instead of the hydraulic control circuit 34 of the embodiment.

The hydraulic control circuit 34B is provided with a regulating valve 45B having two opposite pressure receiving surfaces for solenoid pressure and a switching valve 46B. A spring 51B acts on one end of a spool of the switching valve 46B, and solenoid pressure is applied to other end of the spool.

To one end of a spool of the regulating valve 45B second brake pressure, solenoid pressure passed through a second switching valve 46C and a pressing force of a spring 53B are applied, and to the other end of the spool the solenoid pressure is applied.

When the solenoid pressure is increased, the spool of the switching valve 46B is moved to block the solenoid pressure passing through the switching valve 46B, and the regulating valve 45B is changed from a Low gain state to a Hi gain state. As shown in FIG. 10, therefore, second brake pressure outputted from the regulating valve 45 is controlled at a Hi gain and Low gain according to change of the solenoid pressure as in the embodiment.

Thus, since the second brake pressure (engagement element pressure) can be controlled by switching the Hi gain (second gain) and Low gain (first gain) by use of one regulating valve and one switching valve, a compact hydraulic circuit can be realized.

Figure 12B:
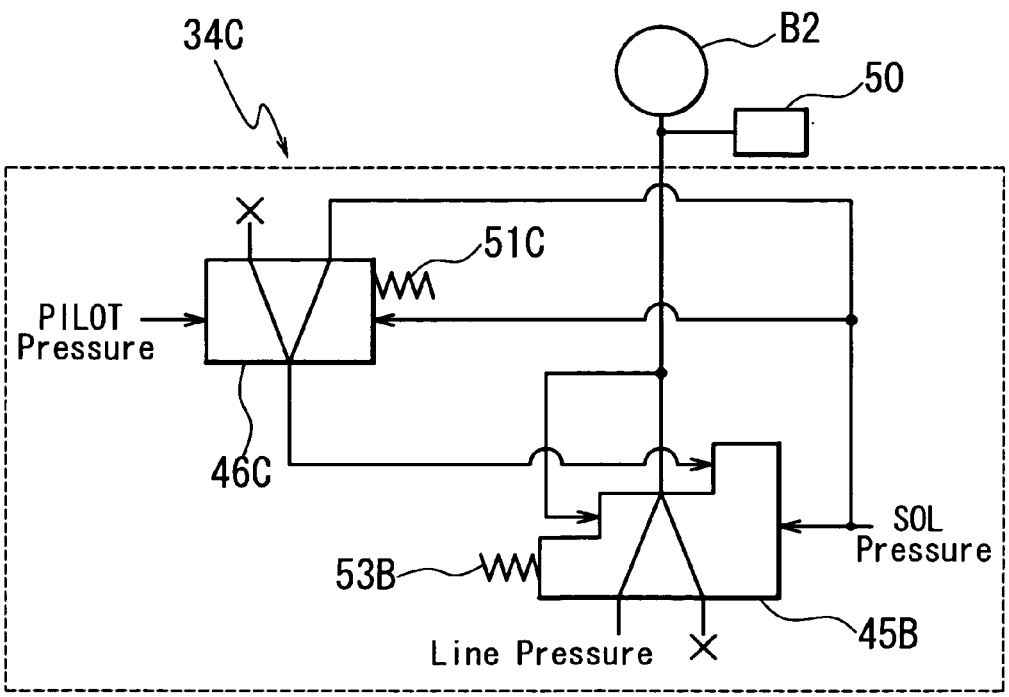
FIG. 12b is a diagram showing a modification of the hydraulic control circuit.
Figure 13:
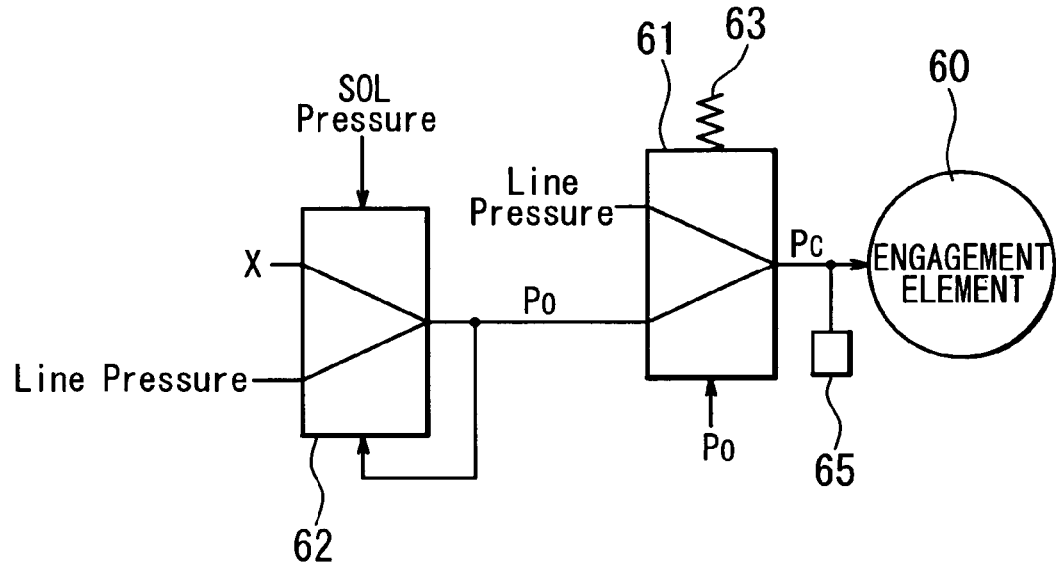
FIG. 13 is a diagram showing an example of oil pressure supply to engagement elements in a conventional hydraulic control device.
Figure 14:
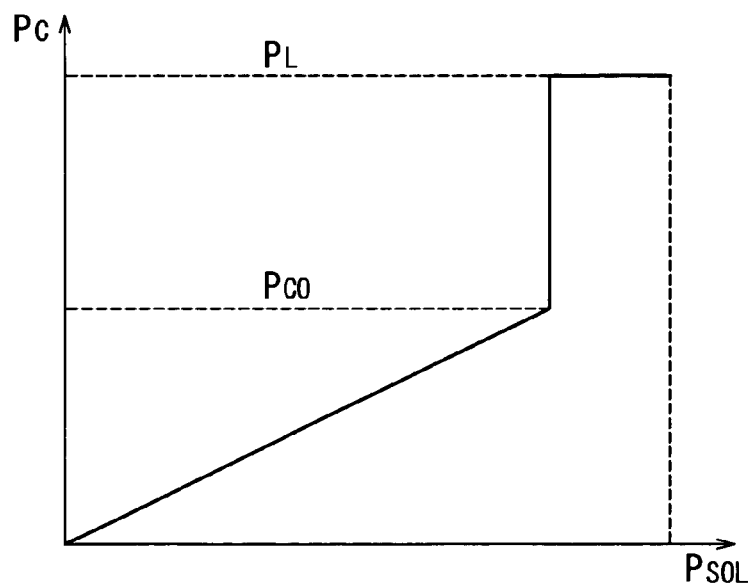
FIG. 14 is a diagram showing change characteristics of an engagement element pressure Pc in the conventional hydraulic control device.

As the third modification, a hydraulic control circuit 34C shown in FIG. 12*b* may be used instead of the hydraulic control circuit 34 of the embodiment.

The hydraulic control circuit 34C is provided with a switching valve 46C instead of the switching valve 46B of the second modification, pilot pressure is applied to one end of a spool of the switching valve 46C, and a spring 51C and solenoid pressure are applied to the other end of the spool.

When the solenoid pressure is increased, the spool of the switching valve 46C is moved to block the solenoid pressure passing through the switching valve 46C, and the regulating valve 45B is changed from the Low gain state to the Hi gain state. Therefore, as in the embodiment, second brake pressure outputted from the regulating valve 45B is controlled at the Hi gain and Low gain according to change of the solenoid pressure as shown in FIG. 10.

Thus, since the second brake pressure (engagement element pressure) can be controlled by switching the Hi gain (second gain) and Low gain (first gain) by use of one regulating valve and one switching valve, a compact hydraulic circuit can be realized.

What is claimed is:

1. A hydraulic control device for an automatic transmission that comprises an engagement element pressure control section for controlling an engagement element pressure, engagement elements that are switched to an engagement state, a disengagement state and a shifting state that is a transition from the engagement state to the disengagement state or from the disengagement state to the engagement state by the controlled engagement element pressure, to achieve gear positions by engaging or disengaging the engagement elements, and an oil pressure switches provided in oil supply paths of the engagement element pressure, said engagement element pressure control section controls the engagement element pressure with a first gain when the engagement elements are in the shifting state and controls the engagement element pressure with a second gain when the engagement elements are in the engagement state.

2. A hydraulic control device for an automatic transmission according to claim 1, wherein the engagement element pressure control section controls the engagement elements by a change amount larger than the first gain in case of controlling the engagement elements with the second gain.

3. A hydraulic control device for an automatic transmission according to claim 1 or 2, wherein the engagement element pressure control section has one regulating valve and one switching valve.

4. A hydraulic control device for an automatic transmission according to claim 3, wherein a pilot pressure is generated by regulating a line pressure served as a reference pressure of the engagement element pressure and a solenoid pressure is generated by regulating the pilot pressure, and wherein the regulating valve has a spool provided therein, an engagement element pressure outputted from the regulating valve is applied to one end of the spool, an output from the switching valve is further applied to the one end, the solenoid pressure is applied to the other end of the spool, and the regulating valve receives a line pressure and regulates the line pressure to generate the engagement element pressure;and the switching valve has a spool provided therein, the solenoid pressure and a spring force are applied to one end of the spool, the pilot pressure is applied to the other end of the spool, the switching valve receives the engagement element pressure and switches ON and OFF of passing of the engagement element pressure to cause the engagement element pressure to act on the one end of the spool of the regulating valve, the switching valve causes the engagement element pressure to pass and act on the one end of the spool of the regulating valve when the solenoid pressure is less than a predetermined value while the regulating valve controls the engagement element pressure with the first gain, and the switching valve stops passing of the engagement element pressure when the solenoid pressure is more than the predetermined value while the regulating valve controls the engagement element pressure with the second gain.

5. A hydraulic control device for an automatic transmission according to claim 3, wherein a pilot pressure is generated by regulating a line pressure served as a reference pressure of the engagement element pressure and a solenoid pressure is generated by regulating the pilot pressure, and wherein the regulating valve has a spool provided therein, an engagement element pressure outputted from the regulating valve is applied to one end of the spool, an output from the switching valve is further applied to the one end, the solenoid pressure is applied to the other end of the spool, and the regulating valve receives a line pressure and regulates the line pressure to generate the engagement element pressure; and the switching valve has a spool provided therein, the solenoid pressure is applied to one end of the spool, the other end of the spool is biased by a spring, the switching valve receives the engagement element pressure and switches ON and OFF of passing of the engagement element pressure to cause the engagement element pressure to act on the one end of the spool of the regulating valve, the switching valve causes the engagement element pressure to pass and act on the one end of the spool of the regulating valve when the solenoid pressure is less than a predetermined value while the regulating valve controls the engagement element pressure with the first gain, and the switching valve stops passing of the engagement element pressure when the solenoid pressure is more than the predetermined value while the regulating valve controls the engagement element pressure with the second gain.

6. A hydraulic control device for an automatic transmission according to claim 3, wherein a pilot pressure is generated by regulating a line pressure served as a reference pressure of the engagement element pressure and a solenoid pressure is generated by regulating the pilot pressure, and wherein the regulating valve has a spool provided therein, an engagement element pressure outputted from the regulating valve is applied to one end of the spool, an output from the switching valve is further applied to the one end, the solenoid pressure is applied to the other end of the spool, and the regulating valve receives a line pressure and regulates the line pressure to generate the engagement element pressure; and the switching valve has a spool provided therein, the solenoid pressure is applied to one end of the spool, the other end of the spool is biased by a spring, the switching valve receives the engagement element pressure and switches ON and OFF of passing of the solenoid pressure to cause the engagement element pressure to act on the one end of the spool of the regulating valve, the switching valve causes the solenoid pressure to pass and act on the one end of the spool of the regulating valve when the solenoid pressure is less than a predetermined value while the regulating valve controls the engagement element pressure with the first gain, and the switching valve stops passing of the solenoid pressure when the solenoid pressure is more than the predetermined value while the regulating valve controls the engagement element pressure with the second gain.

7. A hydraulic control device for an automatic transmission according to claim 3, wherein a pilot pressure is generated by regulating a line pressure served as a reference pressure of the engagement element pressure and a solenoid pressure is generated by regulating the pilot pressure, and wherein the regulating valve has a spool provided therein, an engagement element pressure outputted from the regulating valve is applied to one end of the spool, an output from the switching valve is further applied to the one end, the solenoid pressure is applied to the other end of the spool, and the regulating valve receives a line pressure and regulates the line pressure to generate the engagement element pressure; and the switching valve has a spool provided therein, the solenoid pressure and a spring force are applied to one end of the spool, the pilot pressure is applied to the other end of the spool, the switching valve receives the engagement element pressure and switches ON and OFF of passing of the solenoid pressure to cause the engagement element pressure to act on the one end of the spool of the regulating valve, the switching valve causes the solenoid pressure to pass and act on the one end of the spool of the regulating valve when the solenoid pressure is less than a predetermined value while the regulating valve controls the engagement element pressure with the first gain, and the switching valve stops passing of the solenoid pressure when the solenoid pressure is more than the predetermined value while the regulating valve controls the engagement element pressure with the second gain.

* * * * *